Patented Feb. 26, 1935

1,992,462

UNITED STATES PATENT OFFICE 1,992,462

MANUFACTURE OF FLAVORING MATERIALS

Harold M. Barnett, Garfield Heights, Ohio, assignor to S. M. A. Corporation, Cleveland, Ohio, a corporation of Ohio No Drawing. Application June 9, 1933, Serial No. 675,104

13 Claims. (Cl. 99—11)

This invention relates to methods for the manufacture of flavoring materials from protein matter and, more particularly, to methods of treating protein materials capable of yielding appreciable quantities of glutamic acid.

Protein materials of various kinds may be hydrolyzed to yield mixtures of amino acids which have a very characteristic meat-like flavor, this flavor being obtainable as the result of hydrolysis of proteins from purely vegetable sources as well as from animal proteins. The characteristic flavor is found to be a property of the glutamates, particularly monosodium glutamate, although other amino acids also contribute to the "bouquet" of flavor. Glutamates or a mixture of amino acids containing a considerable proportion of glutamates, constitute valuable condiments or sauces which may be used on food dishes, such as meats, soups, gravies, macaroni, rice, vegetables, etc., to improve the flavor of these. In addition to its value as a flavoring agent, monosodium glutamate has a certain food value in itself and is thought to be an aid to digestion.

Sauces, of which the most important ingredient is glutamic acid or glutamates, due to the large quantity usually present and the meat-like taste referred to, may be prepared by hydrolyzing protein materials with acids, removing the insoluble humin formed during the hydrolysis, and neutralizing the acid with an alkali. Usually, hydrochloric acid will be used for the hydrolysis and sodium hydroxide for the neutralization, so that the final product consists of amino acids and salt.

According to the present invention, the foregoing process is improved by using hydrochloric acid of a certain advantageous concentration, carrying out the neutralization with alkali to a specified point, clarifying the solution in the most advantageous manner and otherwise handling the hydrolysate so as to reduce the expense of the process and obtain the best results. The improved method also includes a procedure whereby valuable amino acids may be recovered as such while not greatly reducing the quality of the treated hydrolysate as a flavoring material.

It is, accordingly, an object of the invention to provide an improved process of hydrolyzing protein matter for the production of a flavoring material. Another object of the invention is to provide a method of treating protein matter to produce a flavoring material in an expeditious manner requiring a minimum of time. Still another object of the invention is to provide a method of treating protein hydrolysates to recover individual amino acids therefrom.

Protein matter is ordinarily hydrolyzed to produce amino acids due to the breaking down of the proteins by boiling the same with hydrochloric acid, although other acid mediums may also be used or enzymes may be employed. Where hydrochloric acid constitutes the hydrolyzing medium, a dilute acid may be used for a long period or a concentrated acid may be used for a shorter period. In either case there are certain disadvantages, a loss of time in the case of dilute acid involving the tying up of equipment and reduction of yield per unit of such equipment, and a loss of acid in the case of concentrated acid due to the escape of vapors during the hydrolysis. I have found that the best results from the point of view of time of reaction and consumption of acid are obtained by the use of hydrochloric acid of such a strength that that concentration known as "constant boiling" prevails during the greater part of the hydrolysis time. Constant boiling hydrochloric acid has a concentration of about 20% HCl and possesses the characteristics of boiling at the highest temperature obtainable with hydrogen chloride-water mixtures and giving off its constituents in the same proportions as these are present in the residual acid. The result is that mere boiling does not change the composition of the acid mixture. However, the hydrolysis of the protein material consumes hydrogen chloride and acid which is constant-boiling when added tends to fall below this strength. By adding acid of greater strength, it is found that allowance may be made for that consumed in the hydrolysis, leaving an acid of substantially constant boiling strength in the reaction vessel. This initial strength is found to be about 27% HCl, which gives a resulting acid much nearer constant boiling than when constant boiling acid is added at the start. Acid of this strength brings about complete, or nearly complete, hydrolysis in about 10 to 12 hours when added in the ratio of three parts of acid to one part of protein.

As an example, protein materials, preferably those having a high glutamic acid content, such as wheat gluten or casein, are boiled with hydrochloric acid having a specific gravity of approximately 1.135 (27% HCl), three parts of acid being added for each part of protein. The protein material is added to the acid, which has been heated to about 70° C., and the temperature is held at this point for 1 or 2 hours. A special type of reflux condenser is then attached and the mixture is boiled for about 12 hours. It is to be understood, however, that the conditions under which the hydrolysis is carried out may be varied as respects time, temperature, strength of acid, the use of catalysts, ratio of acid to protein, etc., so as to conform to whatever conditions may arise. For example, the hydrolysis may be carried on under pressure to reduce the time of treatment although this is accompanied with practical difficulties which it is desired to avoid.

The hydrolysate resulting from the above described reaction is then concentrated under reduced pressure until the amount of HCl left in the mass, when neutralized with alkali, will give the desired ratio between sodium chloride and organic matter in the finished product from the point of view of flavor and keeping qualities. About 14% of salt is found to be desirable. The alkali used for neutralization will ordinarily be a compound of sodium which does not leave a toxic residue, since the product of neutralization should be sodium chloride where a food product is being prepared and no poisonous ingredient must be present. The concentration under reduced pressure results in the removal of a considerable quantity of hydrogen chloride, namely, all of that which can be removed without raising the temperature above 120° C. In this way about 45% of the total hydrogen chloride may be saved and used again in diluting concentrated acid for subsequent hydrolysis. The evaporation also results in the removal of a large portion of the undesirable volatile compounds which are formed during the hydrolysis.

The hydrolysate which has had a considerable proportion of its acid removed by evaporation but which has not yet been neutralized, is diluted with hot water in amount equal to the volume of the hydrolysate and is then agitated and cooled, during which operations sufficient alkali, in the form of a 30–35% sodium hydroxide solution for example, is slowly added to bring the acidity to a point within the pH range 5.2 to 5.8. The alkali should not be added too rapidly since this results in considerable decomposition as evidenced by the strong odor of ammonia and other compounds typical of the action of strong alkali on organic materials.

The feature just mentioned of stopping the neutralization with alkali at a point within the pH range of 5.2 to 5.8 is an important one, the significance of which has not heretofore been known. Ordinarily neutralization connotes carrying the procedure to the point commonly known as neutrality, that is pH 7.0, but it has now been found that better results are attained if neutralization is stopped short of this point and within the range mentioned. The reasons for this are that the most important component in a flavoring material provided by hydrolysis of protein matter is the glutamate ion and, since glutamic acid itself is not highly ionized, it is important that the neutralization be carried far enough so that most of the glutamic acid in the hydrolysate is converted into monosodium glutamate which is highly ionized, thus giving the strongest flavoring power. This salt exists in greatest proportion when the mixture is not more acid than pH 5.2. On the other hand, if neutralization is carried beyond about pH 5.8, in the direction of increasing basicity, an undesirable taste begins to appear due to the action of the alkali on the other constituents of the flavoring material. Thus, addition of alkali to an acid solution in such amounts as will produce the greatest quantity of monosodium glutamate is desirable, but this treatment must be discontinued short of the point where the alkali commences to break down other constituents of the mixture. It is found that the optimum effect is produced when neutralization is carried to a point within the range pH 5.2 to 5.8.

The importance of attaining the correct acidity renders it necessary to follow the neutralization with exactness and this introduces another difficulty in the process which has also been surmounted. Indicators cannot be used because of the dark color of the mixture and various electrodes used for following the neutralization were often found to be "poisoned" by the humin and other constituents so that erratic readings were obtained. However, if samples of the hydrolysate are first diluted about ten times with water, then accurate potentiometric pH determinations may be made by the use of electrodes, e. g., the quinhydrone electrode. The amino acids in the mixture have the quality of "buffers" and therefore the pH number of the solution, so diluted, is the same as that of the undiluted hydrolysate. The determination made in this way is found to be accurate and reliable.

After neutralization of the hydrolysate to the prescribed end point, it is cooled and allowed to stand for several hours in order to reach approximate equilibrium as far as the solubility of the less soluble materials is concerned. During this period from 0.5 to 1.0% of activated carbon is added and the mixture is agitated, the carbon adsorbing additional undesirable substances not removed during the preceding step of evaporating acid. The amount of carbon used should not exceed the given amounts since an excess removes too much of the dark color which is desired by the consumer in the finished product. The neutralized and clarified hydrolysate is then filtered and the carbon-humin cake obtained is washed with cold water.

The foregoing step is an improvement on present methods in that these have commonly included the removal of some of the humin from the acid hydrolysate by filtration before neutralization. This extra step of filtering a strongly acid mixture, with the difficulties attendant on the handling of such a strongly acid liquid, is entirely avoided by carrying out the clarification in one step, as described, by treating the hydrolysate, after neutralization, with activated carbon or other effective form of carbon in finely divided condition. A clear flavoring sauce is thus obtained from protein materials with only one separation from insoluble material.

The filtered flavoring material and washes from the carbon humin precipitate may be further diluted with at least 5%, and preferably 10%, of water, the product, containing only hydrolyzed protein and sodium chloride, being then ready for immediate bottling. Dilution is a valuable improvement over the procedure heretofore followed in preparing sauces from protein hydrolysates in that the dilution keeps the substances in solution which would otherwise crystallize upon standing and form a sediment in the product. It has been usual to take care of this difficulty by allowing the flavoring material to stand in vats for several weeks and then to remove by filtration or decantation the material which precipitates during the aging period. Such procedure requires additional equipment, floor space and time, whereas the simple dilution step set forth permits the sauce to be completely processed and bottled in 24 hours from the time when hydrolysis of the raw material was begun.

The final product has an approximate composition of 14% sodium chloride and 20% of organic matter, consisting primarily of amino acids and their salts. If desired, a more concentrated flavoring material containing from 45-50% of total solids may be provided, but it is found that, in so doing, the loss of amino acids, such as leucine, is great, due either to the low solubility of these acids or to the salting out effect of the salt. Balancing the advantages of the more concentrated product against the decided decrease in yield and the extra steps and time required therefor, it is believed that it is more advisable to prepare a flavoring material of moderate strength, that containing 35% of total solids being producible at less than one-half the cost of a product containing 45% total solids and obtained from the same hydrolysate.

The foregoing process may also be caused to yield quantities of individual amino acids while leaving a sauce of practically the same value as a flavoring material. Thus, the carbon-humin filter cake obtained as a result of the clarification and filtering of the neutralized hydrolysate contains a variable quantity of the amino acid, tyrosine, which has a low solubility in cold water. After such cake has been washed with water, as mentioned, it may be boiled with water, say about 1 liter of water for each 5 grams of tyrosine found to be present in the cake. The solution thus obtained is then filtered and the filtrate is cooled to yield tyrosine, which crystallizes in large white needles and may be collected in that form by further filtration.

Another product which may be obtained is pure glutamic acid, a portion of this compound being recovered in the pure form while leaving sufficient in the hydrolysate so that this latter still constitutes a valuable flavoring material. Where this is done, only protein materials of high glutamic acid content, such as wheat gluten, should be used. The hydrolysis is carried on as described above but the neutralization of the hydrolysate is stopped at about pH 3.2, the isoelectric point of glutamic acid, and the insoluble humin substances are removed while the solution is still warm. The hydrolysate, having the prescribed acidity, is then allowed to stand for 2 days, during which time about half of the total glutamic acid present, amounting to about 10-15% when commercial wheat gluten with 80% protein content is used, crystallizes and may be recovered by centrifuging or other suitable means and then washed. The glutamic acid thus recovered constitutes in itself a valuable flavoring agent of greater strength than sauces which contain only a proportion of this substance. At the same time, the remaining filtrate, when protein materials capable of yielding large quantities of glutamic acid are used, still contains as much or more glutamic acid as similar liquid flavoring materials prepared from protein matter of low glutamic acid content. Also, of course, the other amino acids remain in the hydrolysate to impart their flavor. The filtrate, from which a portion of the glutamic acid has been removed, is then further neutralized to a point within the pH range 5.2 to 5.8 to convert the acid to the monosodium glutamate form as prescribed, is concentrated, and filtered again if necessary. The sauce is then ready for bottling or for filling into larger containers for shipment.

Removal of a portion of the glutamic acid in the foregoing manner also results in the removal of some of the soluble coloring material of the hydrolysate so that the liquid flavoring material is not as deeply colored as when the process is carried out without recovering glutamic acid. While it is believed that the color of the sauce does not affect its flavoring power, custom demands dark brown sauces and it may be found necessary to deepen the color of the sauce by the addition of burnt sugar color or caramel.

The glumatic acid thus obtained from the hydrolysate before final conversion of the latter to a flavoring sauce, is often contaminated with from 1-10% of tyrosine. It is found that these two amino acids may be separated by adding about 5 volumes of water to the mixture to form a suspension and then slowly adding an alkali, or a strong solution of an alkali, such as sodium hydroxide, until the acidity is approximately pH 6.0, and then cooling the solution. The alkali causes the glutamic acid to dissolve and form monosodium glutamate while the tyrosine, having a very low solubility in cold water of this acidity, remains undissolved and may be separated by filtration or other suitable means and washed. The filtrate, containing the glutamic acid in the form of monosodium glutamate, may be worked up as this salt or glutamic acid may be largely reprecipitated by adding concentrated hydrochloric acid, or other strong acid, until an acidity of about pH 3.2 is reached. At least 90% of the glutamic acid may be recovered, free from tyrosine, by this method. The tyrosine may be purified by dissolving in boiling water as previously described, filtering, and collecting the tyrosine which crystallizes upon cooling. Thus, three products, a sauce having a meat-like flavor, glutamic acid or monosodium glutamate, and tyrosine, may be recovered as the result of one hydrolysis of protein matter.

The method set forth herein is much more expeditious and less expensive to carry out than those previously used due to the use of hydrochloric acid of such strength as to produce constant boiling acid during the hydrolysis of protein matter and also due to clarifying the hydrolysate in one operation by the use of activated carbon on a previously neutralized solution, instead of attempting to treat a strongly acid hydrolysate, and by diluting the final product to avoid a slow settling treatment. The process is rendered still more economical by providing for the recovery of glutamic acid and tyrosine as individual amino acids from hydrolysates of protein materials capable of yielding large quantities of glutamatic acid, the recovery of these amino acids being so carried out as to leave a liquid flavoring material which is still of great strength. Thus, the process may be made to result in more than one product including both a liquid and a solid flavoring material having the characteristic of imparting a desirable meat-like flavor to foods on which they are used.

What I claim is:

1. A method of preparing a flavoring material which comprises, hydrolyzing protein matter in the presence of hydrochloric acid, and neutralizing the resulting hydrolysate to a hydrogen ion concentration of about pH 5.2 to 5.8.

2. A method of preparing a flavoring material which comprises, hydrolyzing protein matter in the presence of hydrochloric acid until the proteins have been converted to amino acids, removing a portion of the residual hydrochloric acid by evaporation, and neutralizing the remaining acid with a sodium compound until the solution has a hydrogen ion concentration of about pH 5.2 to 5.8.

3. A method of preparing a flavoring material which comprises, hydrolyzing protein matter in the presence of hydrochloric acid until the proteins have been converted to amino acids, removing residual hydrochloric acid by evaporation until there is left in the hydrolysate only so much hydrochloric acid as will produce the desired proportion of salt in the final product, and then neutralizing with sodium hydroxide to about pH 5.2 to 5.8.

4. A method of preparing a flavoring material which comprises, hydrolyzing protein matter in an acid medium, neutralizing the resulting hydrolysate to about pH 5.2 to 5.8, adding finely divided adsorptive carbon thereto, and filtering out the carbon-humin residue.

5. A method of preparing a flavoring material which comprises, hydrolyzing protein matter in the presence of hydrochloric acid, distilling off a portion of the hydrochloric acid, neutralizing the hydrolysate to about pH 5.2 to 5.8, adding about 0.5 to 1.0% of activated carbon thereto, and filtering out the carbon-humin residue.

6. A method of preparing a flavoring material which comprises, hydrolyzing protein matter in an acid medium until the proteins have been converted to amino acids, evaporating to remove a portion of the residual acid medium, neutralizing the remaining acid to about pH 5.2 to 5.8, clarifying, and adding about 5 to 10% of water to the product to keep sediment-forming substances in solution.

7. A method of preparing flavoring materials which comprises, hydrolyzing protein matter in the presence of hydrochloric acid until the proteins have been converted to amino acids, removing a portion of the residual hydrochloric acid by evaporation, adding an amount of water approximately equal to the volume of the remaining hydrolysate, neutralizing with sodium hydroxide to about pH 5.2 to 5.8, cooling, adding about 0.5 to 1.0% of activated carbon, filtering, and diluting the clarified product with water.

8. The method of preparing flavoring materials which comprises, adding hydrochloric acid of about 27% strength to protein matter in the ratio of about three parts of acid to one part of protein matter, hydrolyzing the mixture, and neutralizing the resultant hydrolysate to about pH 5.2 to 5.8.

9. A method of preparing flavoring materials which comprises, hydrolyzing wheat gluten in the presence of hydrochloric acid, evaporating off a portion of the remaining hydrochloric acid upon completion of the hydrolysis, adding alkali to bring the hydrolysate to an acidity of about pH 3.2, precipitating and collectng a porton of the glutamic acid formed, and then further neutralizing the filtrate to an acidity of about pH 5.2 to 5.8.

10. The method of preparing a flavoring material which comprises hydrolyzing protein matter in the presence of an acid and then adjusting the hydrogen ion concentration to approximately from pH 5.2 to 5.8 so as to produce a high concentration of the glutamate ion without causing more than a substantial ionization of other amino acids which produce a bitter taste.

11. The method of treating proteins which comprises hydrolyzing the protein in the presence of an acid and adding a sufficient amount of an alkali to form a highly ionizable glutamate but insufficient to cause the formation of ionizable compounds of other amino acids which have a bitter taste, adding activated carbon to absorb undesirable substances, separating the carbon together with adsorbed material and humin from the flavoring material and then treating the carbon-human cake to obtain tyrosine.

12. The method of treating proteins containing a high potential glutamic acid content which comprises hydrolyzing the protein in the presence of an acid, neutralizing the hydrolysate to about pH 3.2, separating the crystals and treating them to produce glutamic acid and tyrosine, and adding a sufficient amount of alkali to the mother liquor to form a highly ionizable glutamate but insufficient to cause the formation of amino acids which have a bitter taste.

13. The method of preparing a flavoring material which comprises hydrolyzing protein matter in the presence of an acid and then partially neutralizing the resulting hydrolysate to an extent which is substantially less than complete neutralization, the extent of neutralization being sufficient to form a highly ionizable glutamate compound but insufficient to cause the formation of a substantial amount of ionizable compounds of other amino acids which have a bitter taste.

HAROLD M. BARNETT.